(12) United States Patent
Fletcher et al.

(10) Patent No.: US 10,422,351 B2
(45) Date of Patent: Sep. 24, 2019

(54) DEVICES FOR PRODUCING VACUUM USING THE VENTURI EFFECT HAVING A PLURALITY OF SUBPASSAGEWAYS AND MOTIVE EXITS IN THE MOTIVE SECTION

(71) Applicants: David E. Fletcher, Flint, MI (US); Brian M. Graichen, Leonard, MI (US); James H. Miller, Ortonville, MI (US); Keith Hampton, Ann Arbor, MI (US)

(72) Inventors: David E. Fletcher, Flint, MI (US); Brian M. Graichen, Leonard, MI (US); James H. Miller, Ortonville, MI (US); Keith Hampton, Ann Arbor, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 0 days.

(21) Appl. No.: 15/210,190

(22) Filed: Jul. 14, 2016

(65) Prior Publication Data

US 2017/0016414 A1 Jan. 19, 2017

Related U.S. Application Data

(60) Provisional application No. 62/193,633, filed on Jul. 17, 2015.

(51) Int. Cl.
*F04F 5/46* (2006.01)
*F02M 35/10* (2006.01)
(Continued)

(52) U.S. Cl.
CPC .............. *F04F 5/46* (2013.01); *B60T 13/46* (2013.01); *B60T 17/02* (2013.01);
(Continued)

(58) Field of Classification Search
CPC ........ F04F 5/14; F04F 5/16; F04F 5/20; F04F 5/46; F04F 5/464
See application file for complete search history.

(56) References Cited

U.S. PATENT DOCUMENTS

| 1,071,596 A | 8/1913 | Von Vellebit |
| 1,845,969 A | 2/1932 | Hueber |
(Continued)

FOREIGN PATENT DOCUMENTS

| CN | 2400655 | 10/2000 |
| CN | 201907500 | 7/2011 |
(Continued)

OTHER PUBLICATIONS

EP, Supplementary European Search Report; Patent Application No. 14811266.7; 5 pages (dated Apr. 5, 2017).
(Continued)

*Primary Examiner* — Patrick Hamo
(74) *Attorney, Agent, or Firm* — FisherBroyles, LLP; Susan M. Oiler

(57) ABSTRACT

Devices for producing vacuum using the Venturi effect are disclosed that have a motive passageway converging toward a suction chamber, a discharge passageway diverging away from the suction chamber, and a suction passageway, all of which are in fluid communication with the suction chamber. The motive passageway has a single entrance, and subdivides downstream thereof into a plurality of subpassageways, one each leading to one of the plurality of motive exits, which are spaced apart from a discharge entrance of the discharge passageway to define a Venturi gap. The fletch having a plurality of ribs extending between an exterior surface of the generally conically-shaped main body thereof and an interior surface of the motive passageway is disposed in the motive passageway. The ribs divide the motive passageway into the plurality of sub-passageways, each converging fluid flow over the exterior surface thereof toward one of the plurality of motive exits.

16 Claims, 8 Drawing Sheets
(4 of 8 Drawing Sheet(s) Filed in Color)

(51) Int. Cl.
*B60T 13/46* (2006.01)
*B60T 17/02* (2006.01)
*F04F 5/20* (2006.01)

(52) U.S. Cl.
CPC ............... *F02M 35/10157* (2013.01); *F02M 35/10229* (2013.01); *F04F 5/20* (2013.01); *Y02T 10/144* (2013.01)

(56) References Cited

U.S. PATENT DOCUMENTS

| | | | |
|---|---|---|---|
| 2,037,884 A | 4/1936 | Day | |
| 2,044,088 A * | 6/1936 | Lord | E02F 3/90 209/44 |
| 2,074,480 A | 3/1937 | MacLean | |
| 2,183,561 A | 12/1939 | Hamblin | |
| 2,274,276 A | 2/1942 | Rappl | |
| 2,382,391 A | 8/1945 | Berman | |
| 2,512,479 A | 6/1950 | Callejo | |
| 2,626,009 A | 1/1953 | Sebok et al. | |
| 2,790,595 A | 4/1957 | Ebner | |
| 2,905,268 A | 9/1959 | McMichael | |
| 2,954,091 A | 9/1960 | McMichael | |
| 3,064,878 A | 11/1962 | Bayles et al. | |
| 3,093,153 A | 6/1963 | Horowitz | |
| 3,234,932 A | 2/1966 | Bird et al. | |
| 3,239,131 A | 3/1966 | Whyte | |
| 3,430,437 A | 3/1969 | Saussele et al. | |
| 3,581,850 A | 6/1971 | Jaitl | |
| 3,592,438 A | 7/1971 | Greenwood et al. | |
| 3,698,510 A | 10/1972 | Blatt et al. | |
| 3,754,841 A | 8/1973 | Grabb et al. | |
| 3,826,281 A | 7/1974 | Clark | |
| 3,842,932 A | 10/1974 | Gibel | |
| 3,921,915 A | 11/1975 | Glenn et al. | |
| 3,923,081 A | 12/1975 | Persson | |
| 4,070,292 A | 1/1978 | Adams | |
| 4,208,921 A | 6/1980 | Keyes | |
| 4,211,200 A | 7/1980 | Rocchio et al. | |
| 4,308,138 A | 12/1981 | Woltman | |
| 4,354,492 A | 10/1982 | McPhee | |
| 4,379,679 A | 4/1983 | Guile | |
| 4,380,418 A | 4/1983 | Crawford et al. | |
| 4,424,883 A | 1/1984 | Musiani | |
| 4,499,034 A | 2/1985 | McAllister | |
| 4,519,423 A | 5/1985 | Ho et al. | |
| 4,554,786 A | 11/1985 | Takeuchi et al. | |
| 4,634,559 A | 1/1987 | Eckert | |
| 4,683,916 A | 8/1987 | Raines | |
| 4,834,132 A | 5/1989 | Sasaki et al. | |
| 4,893,654 A | 1/1990 | Feuz | |
| 4,938,309 A | 7/1990 | Emdy | |
| 4,951,708 A | 8/1990 | Miller | |
| 5,005,550 A | 4/1991 | Bugin, Jr. et al. | |
| 5,069,062 A | 12/1991 | Malecek et al. | |
| 5,087,175 A | 2/1992 | Raizman et al. | |
| 5,108,266 A | 4/1992 | Hewitt | |
| 5,167,046 A | 12/1992 | Benson | |
| 5,188,141 A | 2/1993 | Cook et al. | |
| 5,291,916 A | 3/1994 | Kloosterman et al. | |
| 5,326,942 A | 7/1994 | Schmid | |
| 5,375,621 A | 12/1994 | Gaehwiler | |
| 5,431,346 A | 7/1995 | Sinaisky | |
| 5,628,623 A | 5/1997 | Skaggs | |
| RE35,532 E | 6/1997 | Duren | |
| 5,816,446 A | 10/1998 | Steindorf et al. | |
| 5,881,759 A | 3/1999 | Andersson | |
| 5,993,167 A | 11/1999 | Mochizuki | |
| 6,035,881 A | 3/2000 | Emmerich et al. | |
| 6,132,629 A | 10/2000 | Boley | |
| 6,138,456 A | 10/2000 | Garris | |
| 6,163,239 A | 12/2000 | Ozawa et al. | |
| 6,192,911 B1 | 2/2001 | Barnes | |
| RE37,090 E | 3/2001 | Kloosterman et al. | |
| 6,220,271 B1 | 4/2001 | Emmerich et al. | |
| 6,254,315 B1 | 7/2001 | Pfeiffer | |
| 6,308,731 B1 | 10/2001 | Kawasaki | |
| 6,325,602 B1 | 12/2001 | Rademacher | |
| 6,626,249 B2 | 9/2003 | Rosa | |
| 7,029,103 B2 | 4/2006 | Iida | |
| 7,100,587 B2 | 9/2006 | Ahlborn et al. | |
| 7,353,812 B1 | 4/2008 | Gosdzinski et al. | |
| 7,610,140 B2 | 10/2009 | Hirooka | |
| 7,628,170 B2 | 12/2009 | Kok-Hiong et al. | |
| 7,673,653 B2 | 3/2010 | Mijers et al. | |
| 7,722,132 B2 | 5/2010 | Carlsson | |
| 7,806,174 B2 | 10/2010 | Khomynets | |
| 7,926,502 B1 | 4/2011 | Lott | |
| 8,136,548 B2 | 3/2012 | Trueb | |
| 8,147,225 B2 | 4/2012 | Kuny | |
| 8,449,763 B2 | 5/2013 | Duyvesteyn | |
| 8,517,056 B2 | 8/2013 | Cullin | |
| 8,622,715 B1 | 1/2014 | Lott et al. | |
| 8,839,607 B2 | 9/2014 | Pursifull et al. | |
| 9,074,523 B2 | 7/2015 | Ulrey et al. | |
| 9,133,796 B2 | 9/2015 | Plymale et al. | |
| 9,827,963 B2 | 11/2017 | Fletcher et al. | |
| 2002/0027041 A1 | 3/2002 | Czabala et al. | |
| 2004/0036185 A1 | 2/2004 | Garcia | |
| 2004/0094848 A1 | 5/2004 | Lange | |
| 2004/0113288 A1 | 6/2004 | Korzeniowski | |
| 2005/0045417 A1 | 3/2005 | Ni | |
| 2005/0061378 A1 | 3/2005 | Foret | |
| 2005/0121084 A1 | 6/2005 | Andersson | |
| 2005/0257838 A1 | 11/2005 | Enerson | |
| 2006/0016477 A1 | 1/2006 | Zaparackas | |
| 2007/0044848 A1 | 3/2007 | Norman | |
| 2007/0152355 A1 | 7/2007 | Hartley | |
| 2008/0007113 A1 | 1/2008 | Choi | |
| 2008/0121480 A1 | 5/2008 | Kawamori et al. | |
| 2008/0145238 A1 | 6/2008 | Shibayama et al. | |
| 2011/0132311 A1 | 6/2011 | Pursifull et al. | |
| 2011/0186151 A1 | 8/2011 | Sparazynski | |
| 2011/0240753 A1 | 10/2011 | Stevenson et al. | |
| 2012/0024249 A1 | 2/2012 | Fuhrmann et al. | |
| 2012/0080134 A1 | 4/2012 | Harris et al. | |
| 2012/0315559 A1 | 12/2012 | Noh et al. | |
| 2013/0139911 A1 | 6/2013 | Wilson et al. | |
| 2013/0160877 A1 | 6/2013 | Walter et al. | |
| 2013/0213510 A1 | 8/2013 | Burnham et al. | |
| 2013/0233276 A1 | 9/2013 | Pursifull et al. | |
| 2013/0233287 A1 | 9/2013 | Leone | |
| 2013/0340732 A1 | 12/2013 | Pursifull et al. | |
| 2014/0014080 A1 | 1/2014 | Beshay et al. | |
| 2014/0123941 A1 | 5/2014 | Ulrey et al. | |
| 2014/0165962 A1 | 6/2014 | Pursifull | |
| 2014/0196694 A1 | 7/2014 | Euliss et al. | |
| 2014/0197345 A1 | 7/2014 | Graichen et al. | |
| 2014/0217679 A1 | 8/2014 | Barrall et al. | |
| 2014/0360607 A1 | 12/2014 | Fletcher et al. | |
| 2014/0366527 A1 | 12/2014 | Fletcher et al. | |
| 2015/0114348 A1 | 4/2015 | Pursifull et al. | |
| 2015/0114350 A1 | 4/2015 | Pursifull | |
| 2015/0147196 A1 | 5/2015 | Chahal et al. | |
| 2015/0158477 A1 | 6/2015 | Luehrsen | |
| 2015/0159677 A1 | 6/2015 | Hampton et al. | |
| 2015/0354601 A1 * | 12/2015 | Tell | F04F 5/20 417/54 |
| 2016/0010661 A1 | 1/2016 | Fletcher et al. | |
| 2016/0040688 A1 | 2/2016 | Fletcher et al. | |

FOREIGN PATENT DOCUMENTS

| | | |
|---|---|---|
| DE | 4310761 | 10/1994 |
| DE | 102014223765 A1 | 6/2015 |
| EP | 0545121 | 6/1993 |
| GB | 190603061 | 11/1906 |
| GB | 1402996 | 8/1975 |
| GB | 2129516 | 5/1984 |
| JP | 2001-295800 | 10/2001 |
| JP | 2004174475 A | 11/2002 |
| JP | 2009168134 | 7/2009 |
| JP | 5538004 B2 | 7/2014 |

(56) References Cited

FOREIGN PATENT DOCUMENTS

| WO | 2014/094890 | 6/2014 |
|---|---|---|
| WO | 2014094878 A1 | 6/2014 |
| WO | 2015/089176 | 6/2015 |

OTHER PUBLICATIONS

CN, Office Action and Search Report with English translation; Chinese Patent Application No. 201410413220.7; (dated Nov. 14, 2016).
Plastic Vacuum Ejector Generator Pneumatic Fitting ZHO7DS (first published at least as early as Dec. 29, 2015).
Racing Vacuum Pump PE 10000-01; http://www.product-engr.com/vacuum_pump.html (first published at least as early as Feb. 20, 2011).
PCT, International Search Report and Written Opinion, PCT/US2014/041250 (dated Oct. 27, 2014).
PCT, International Search Report and Written Opinion, PCT/US2014/059672 (dated Jan. 9, 2015).
PCT, International Search Report and Written Opinion, PCT/US2015/012018 (dated May 8, 2015).
PCT, International Search Report and Written Opinion, PCT/US2015/024195 (dated Jul. 24, 2015).
PCT, International Search Report and Written Opinion, PCT/US2015/033079 (dated Aug. 21, 2015).
PCT, International Search Report and Written Opinion, PCT/US2015/039950 (dated Oct. 5, 2015).
PCT, International Search Report and Written Opinion, PCT/US2015/043911 (dated Nov. 6, 2015).
PCT, International Search Report and Written Opinion, PCT/US2016/012260 (dated Mar. 16, 2016).
U.S. Non-Final Office Action, U.S. Appl. No. 14/294,727; (dated Oct. 8, 2015).
U.S. Non-Final Office Action, U.S. Appl. No. 14/565,075; (dated Nov. 16, 2015).
U.S. Non-Final Office Action, U.S. Appl. No. 14/509,612; (dated Dec. 18, 2015).
U.S. Non-Final Office Action, U.S. Appl. No. 14/600,598; (dated Feb. 11, 2016).
U.S. Final Office Action, U.S. Appl. No. 14/565,075; (dated Apr. 1, 2016).
U.S. Final Office Action, U.S. Appl. No. 14/294,727; (dated Apr. 22, 2016).
English translation of JP 07-117010, accessed Nov. 9, 2015, <https://www4.j-platpat.inpit.go.jp/cgi-bin/tran_web_cgi_ejje?u=http://www4.j-platpat.inpit.go.jp/eng/translation/201511100304293322079174692401010093 2AF2D1BD4629B19B03A22964BC2FC8>.
U.S. Final Office Action, U.S. Appl. No. 14/509,612; (dated Jun. 22, 2016).
U.S. Non-Final Office Action; U.S. Appl. No. 14/565,075; (dated Jul. 21, 2016).
PCT, International Search Report and Written Opinion, PCT/US2016/027229 (dated Jul. 15, 2016).
U.S. Advisory Action; U.S. Appl. No. 14/294,727 (dated Aug. 22, 2016).
PCT, International Search Report and Written Opinion; PCT/US2016/021559 (dated May 12, 2016).
U.S. Advisory Action; U.S. Appl. No. 14/509,612; (dated Sep. 1, 2016).
U.S. Notice of Allowance; U.S. Appl. No. 14/509,612; (dated Oct. 17, 2016).
CN, Search Report with English translation; Chinese Patent Application No. 201480001422.9 (dated Jul. 20, 2016).
CN, Office Action with English translation; Chinese Patent Application No. 201480001422.9 (dated Aug. 1, 2016).
U.S. Final Office Action; U.S. Appl. No. 14/600,598; (dated Aug. 19, 2016).
PCT, International Search Report and Written Opinion, PCT/US2016/042228 (dated Oct. 17, 2016).
U.S. Office Action, U.S. Appl. No. 15/097,558 dated Nov. 3, 2017.
U.S. Office Action, U.S. Appl. No. 15/065,470 dated Nov. 16, 2017.
CN, Second Office Action with English Translation, Chinese Application No. 201410413220.7 dated Jul. 18, 2017 (5 pages).
CN, Third Office Action, Supplemental Search Report with English Translation, Chinese Application No. 201410413220.7 dated Jan. 3, 2018 (6 pages).
CN, Third Office Action English Translation; Chinese Application No. 201410413220.7 (dated Jan. 17, 2018).
JP, Non-Final Office Action with English Translation; Japanese Application No. 2016-519556 (dated May 18, 2018).
EP, European Supplemental Search Report; European Application No. 16762428.7 (dated Jul. 5, 2018).
U.S., Final Office Action; U.S. Appl. No. 15/097,558 (dated Apr. 4, 2018).
U.S., Final Office Action; U.S. Appl. No. 15/065,470 (dated Mar. 29, 2018).
U.S., First Office Action, U.S. Appl. No. 15/791,561 (dated Jul. 26, 2018).
CN, First Office Action; Chinese Application No. 201680013143.3 (dated Jul. 31, 2018).
CN, First Office Action Search Report; Chinese Application No. 201680013143.3 (dated Jul. 31, 2018).
U.S., Office Action, U.S. Appl. No. 15/065,470 (dated Jul. 9, 2018).
U.S., Non-Final Office Action; U.S. Appl. No. 15/065,470 (dated Aug. 27, 2018).
CN, First Office Action; Chinese Application No. 201680040276X (dated Oct. 30, 2018).
CN, First Office Action Search Report; Chinese Application No. 201680040276X (dated Oct. 30, 2018).
U.S., Non-Final Office Action; U.S. Appl. No. 15/097,558 (dated Sep. 10, 2018).
JP, First Office Action; Application No. 201680040276X (dated Oct. 30, 2018).
JP, First Office Action Search Report; Application No. 201680040276X (dated Oct. 30, 2018).
EP, Supplemental Search Report; European Application No. 16780599.3 (dated Dec. 14, 2018).
EP, Supplemental Search Report; European Application No. 16828264.8 (dated Dec. 18, 2018).

* cited by examiner

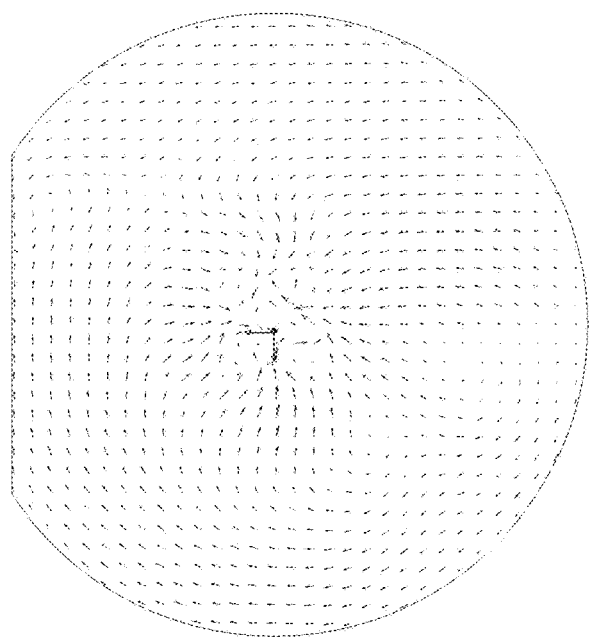
FIG. 11
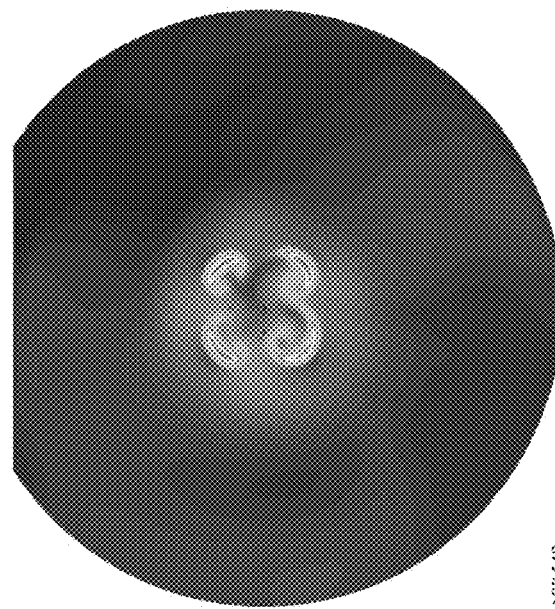
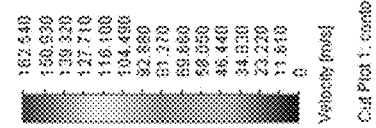

DEVICES FOR PRODUCING VACUUM USING THE VENTURI EFFECT HAVING A PLURALITY OF SUBPASSAGEWAYS AND MOTIVE EXITS IN THE MOTIVE SECTION

TECHNICAL FIELD

This application relates to devices for producing vacuum using the Venturi effect, more particularly to such devices having a single entrance into the motive passageway and a plurality of distinct motive exits to generate increased suction flow with a minimal motive flow rate.

BACKGROUND

Engines, for example vehicle engines, are being downsized and boosted, which is reducing the available vacuum from the engine. This vacuum has many potential uses, including use by the vehicle brake booster.

One solution to this vacuum shortfall is to install a vacuum pump. Vacuum pumps, however, have a significant cost and weight penalty to the engine, their electric power consumption can require additional alternator capacity, and their inefficiency can hinder fuel economy.

Another solution to generate vacuum is to utilize a Venturi device, either an ejector or an aspirator. An ejector generates vacuum through the Venturi effect when the motive air is taken down stream of the turbocharger compressor or another high pressure source and discharged in a low pressure region. An aspirator generates vacuum through the Venturi effect when the motive air is taken before the throttle, typically at atmospheric pressure, and discharged downstream of the throttle. The problem with presently available Venturi devices is their limitations on the amount of suction mass flow rate, and the amount of engine air they consume.

A need exists for improved designs that increase suction mass flow rate, in particular when the motive flow is a boosted motive flow.

SUMMARY

In one aspect, devices for producing vacuum using the Venturi effect are disclosed that have a housing defining a suction chamber, a motive passageway converging toward the suction chamber and in fluid communication therewith, a discharge passageway diverging away from the suction chamber and in fluid communication therewith, and a suction passageway in fluid communication with the suction chamber. The motive passageway has a single entrance and a plurality of motive exits, and subdivides downstream of the single entrance into a plurality of subpassageways, one each leading to one of the plurality of motive exits. The plurality of motive exits are generally aligned with and spaced apart from a discharge entrance of the discharge passageway to define a Venturi gap. The cross-sectional area of the plurality of motive exits, collectively, is smaller than the cross-sectional area of the discharge entrance.

In all embodiment, the motive passageway may include a fletch disposed therein. The fletch has a generally conically-shaped main body positioned with a base of the main body proximate the plurality of motive exits, and a plurality of ribs extending between an exterior surface of the generally conically-shaped main body and an interior surface of the motive passageway positioned to divide the motive passageway into the plurality of sub-passageways each converging fluid flow over the exterior surface of the generally conically-shaped main body toward one of the plurality of motive exits. The generally conically-shaped main body converges toward its base following a straight, parabolic, hyperbolic, or polynomial curve function, and the interior shape of the motive exit and the exterior shape of the base of the generally conically-shaped main body are both circular or elliptical. The plurality of ribs protrude from the exterior surface of the generally conically-shaped main body.

In all embodiments, the plurality of motive exits are generally flush with a wall of the suction chamber and the fletch may include a tail positioned within the suction chamber in alignment with the plurality of motive exits for fluid flow from the plurality of motive exits to flow over an exterior surface of the tail.

In all embodiments, the discharge entrance protrudes into the suction chamber a distance thereby providing suction flow around the entirety of an exterior surface of the discharge entrance. Here, the fletch may include a tail positioned within the chamber in alignment with the plurality of motive exits for fluid flow from the plurality of motive exits to flow over an exterior surface of the tail toward an apex of the tail. The apex of the tail is positioned inside the discharge entrance of the discharge passageway. Here, also, the suction chamber can have a generally rounded interior bottom below the discharge entrance, and an internal width of about a 10 mm to about a 25 mm.

In all aspects, the motive passageway and the discharge passageway of the devices may both diverge in cross-sectional area away from the suction chamber as a hyperbolic or parabolic function. Further, each subpassageway may be generally rectangular in cross-section proximate one of the plurality of motive exits. If so, each subpassageway converges toward one of the plurality of motive exits from the main passageway with an outer interior wall, when viewed from a top, longitudinal cross-section, as a hyperbolic function, and/or converges toward one of the plurality of motive exits from the main passageway with an inner interior wall, when viewed from a top, longitudinal cross-section, as a hyperbolic function.

In another aspect, systems are disclosed, in particular, internal combustion engines that include any one of the devices for producing vacuum using the Venturi effect disclosed herein. One system has a source of pressure fluidly connected to the motive passageway, a device requiring vacuum fluidly connected to the suction passageway, and a pressure lower than the source of pressure fluidly connected to the discharge passageway. The source of pressure may be atmospheric pressure or it may be boost pressure from a compressor of a turbocharger or supercharger.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a side, perspective view of a device that generates vacuum using the Venturi effect.

FIG. 11 includes CFD modelings of the suction flow, taken at distance $D_3$ of FIG. 8, as it engages the motive plume.

DETAILED DESCRIPTION

Figure 1A:
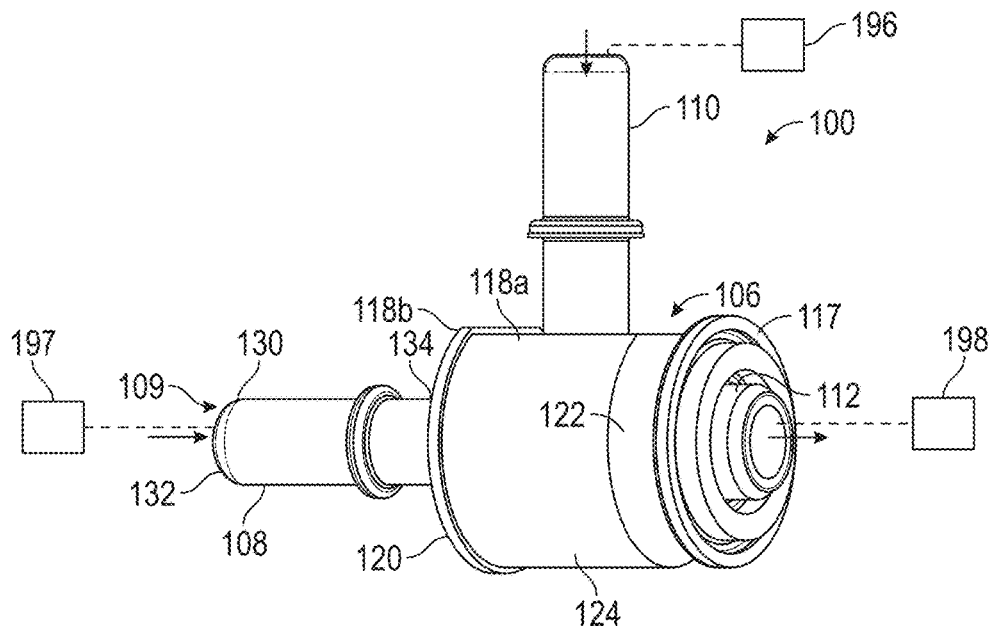
FIG. 1A is a side, longitudinal, cross-sectional view of just the inlet end of the motive port of an alternate embodiment of the device of FIG. 1.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

Figure 1A:
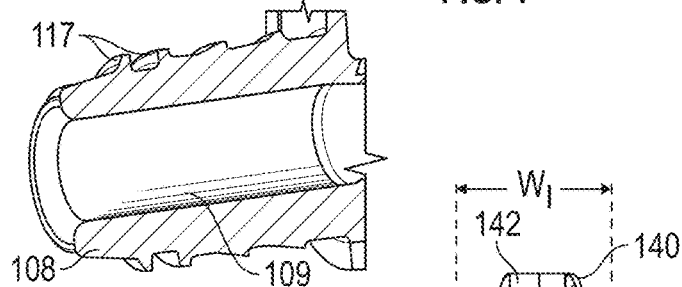
Figure 2:
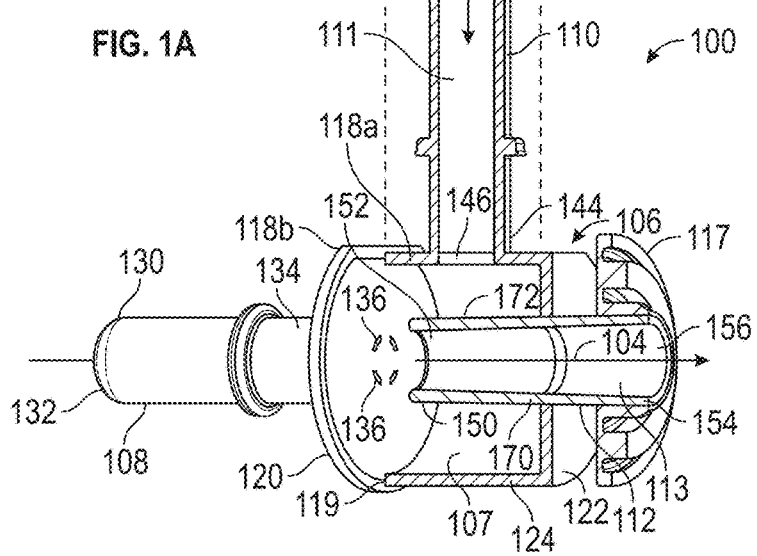
FIG. 2 is a side, longitudinal, cross-sectional view of all but the motive port of one embodiment according to FIG. 1.
Figure 3:
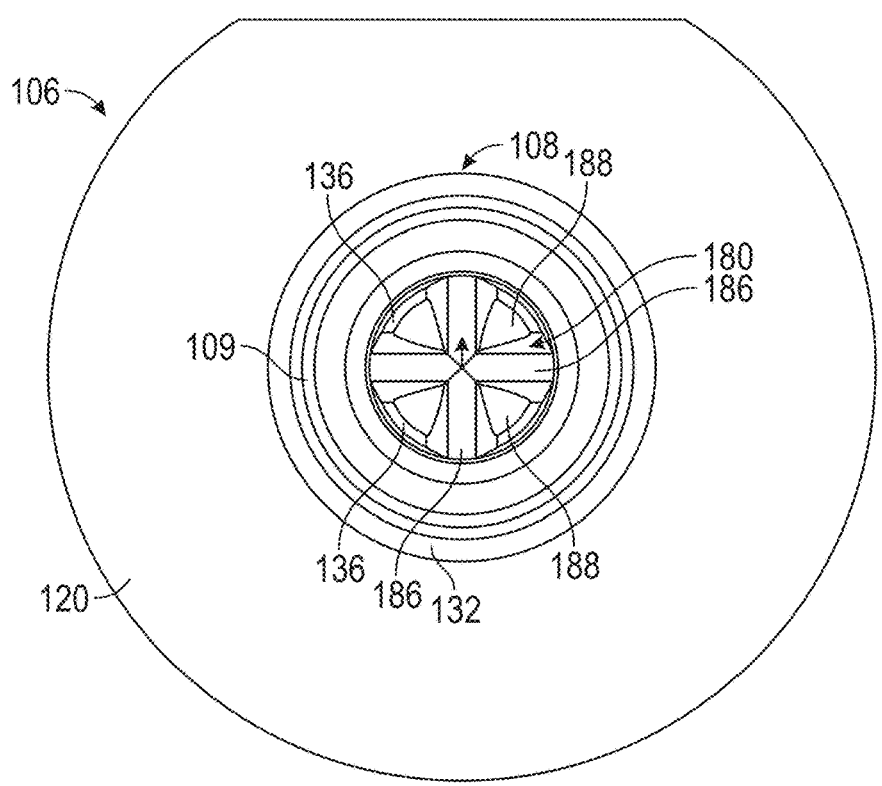
FIG. 3 is an end view of the motive port end of the device of FIG. 2.

FIGS. 1-3 illustrate different views of a device 100 for producing vacuum using a Venturi effect. The device 100 may be used in an engine, for example, in a vehicle's internal combustion engine to provide vacuum to a device such as a vehicle brake boost device, positive crankcase ventilation system, a fuel purge device, a hydraulic and/or pneumatic valve, etc. Device 100 includes a housing 106 defining a suction chamber 107 in fluid communication with passageway 104 (FIG. 2) and having at least three ports that are connectable to an engine or components connected thereto. The ports include: (1) a motive port 108; (2) a suction port 110, which can connect via an optional check valve (not shown) to a device requiring vacuum 196; and (3) a discharge port 112. Each of these ports 108, 110, and 112 may include a connector feature 117 on an outer surface thereof for connecting the respective port to a hose or other component in the engine, as shown in FIG. 1A for the motive port 108 or in FIGS. 1, 2, and 6 for the discharge port 112. The motive port 108 may be connected to the compressor 197 of a turbocharger or supercharger as a source of pressure and the discharge port 112 maybe connected downstream of the fluid passageway downstream of the throttle and/or to the air intake manifold 198 of the internal combustion engine as a pressure lower than the source of pressure.

Referring now to FIGS. 1 and 2, the housing 106 defining the suction chamber 107 includes a first end wall 120 proximate the motive port 108, a second end wall 122 proximate the discharge port 112 and at least one side wall 124 extending between the first and second end walls 120, 122. The suction chamber 107, when viewed in a transverse cross-section, may have a generally rounded bottom below the entrance 152 to the discharge port 112. As shown in FIG. 2, the suction chamber 107 may be a two-part construction having a container 118a and a lid 118b, where the lid 118b seats within or against a rim 119 of the container 118a with a fluid-tight seal. Here, the container 118a includes the suction port 110 and the discharge port 112 and the lid 118b includes the motive port 108, but is not limited thereto. In another embodiment, the container could include the motive port and the lid could include the suction port and the discharge port.

Figure 7:
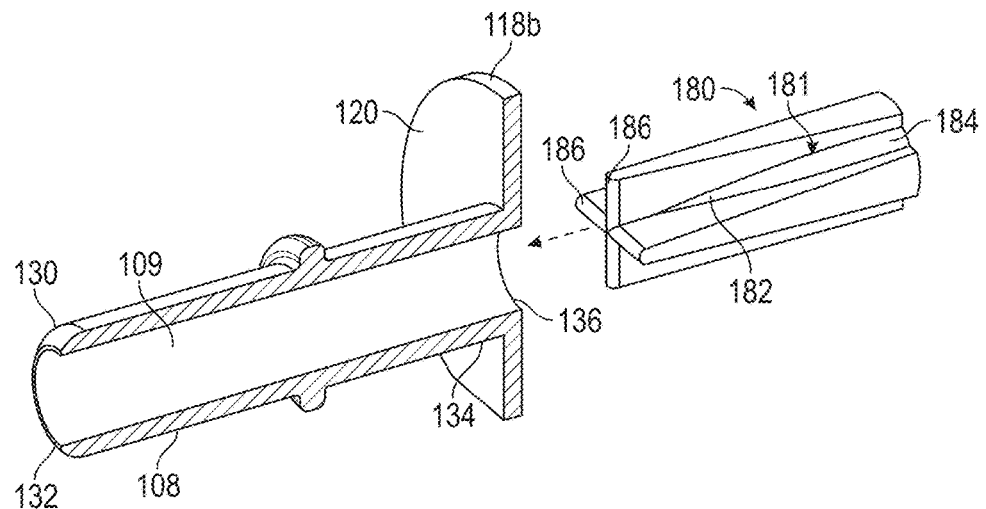
FIG. 7 is a longitudinal cross-sectional view of the motive port and a perspective view of the fletch of FIG. 4 in an unassembled state.

The motive port 108 defines a motive passageway 109, shown in FIGS. 3 and 7, for the flow of fluid toward the suction chamber 107 and in fluid communication therewith. The motive passageway 109 may be generally cylindrically-shaped to receive the fletch 180. The motive port 108 includes an inlet end 130 having a motive entrance 132 and an outlet end 134 having a motive exit 136. The motive passageway 109 may have a circularly-shaped motive entrance and the passageway may be straight or it may gradually continuously taper toward the plurality of motive exits 136, which each may be generally circular, elliptical, or any other polygonally-shaped opening.

The suction port 110 defines a suction passageway 111 in fluid communication with the suction chamber 107. The suction port 110 includes an inlet end 140 having a suction entrance 142 and an outlet end 144 having a suction exit 146, wherein both the motive exit 136 and the suction exit 146 exit into the suction chamber 107. As illustrated in FIG. 2, the suction passageway 111 enters the suction chamber 107 at a position that generates about a ninety degree change in the direction of the suction flow from the suction passageway 111 to the discharge passageway 113. Accordingly, the suction port 110 is generally oriented perpendicular to the discharge port 112, and may be a generally cylindrical passage of constant dimension(s) as shown in FIG. 2, or it may gradually, continuously taper as a cone or according to a hyperbolic or parabolic function along its length converging toward the suction chamber 107. In other embodiments, the suction port 110 could enter the suction chamber 107 at a position that generates about a 180 degree change in the direction of the suction flow from the suction passageway 111 to the discharge passageway 113. Here, the suction port 110 would be generally parallel to the discharge port 112.

Figure 6:
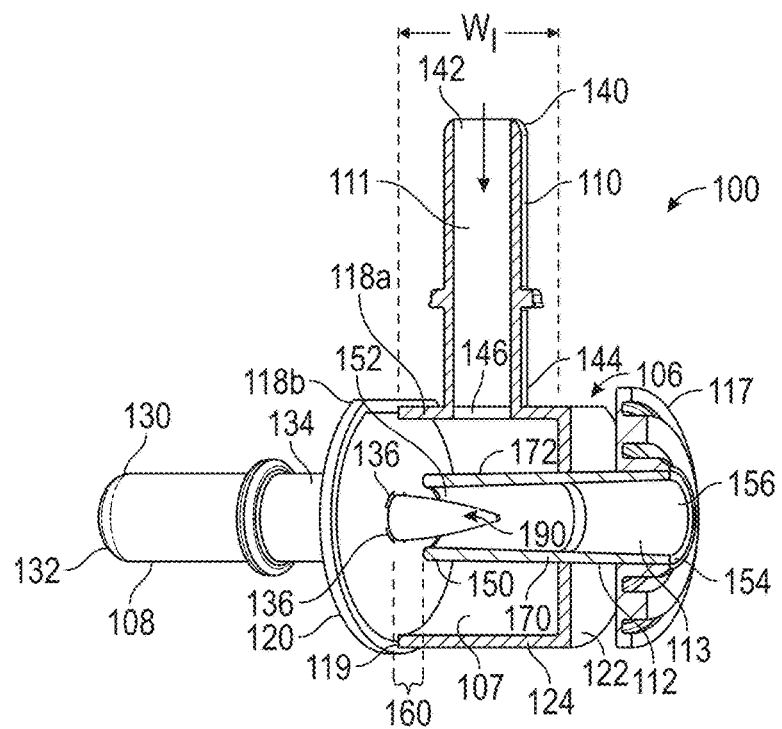
FIG. 6 is the longitudinal cross-section of FIG. 2 with a tail seated within the suction chamber thereof.

Device 100 has the outlet end 134 of the motive passageway 109, more specifically, the motive exits 136, generally aligned with and spaced apart from the discharge entrance 152 at the inlet end 150 of the discharge passageway 113 to define a Venturi gap 160 (labeled in FIG. 6). The Venturi gap 160, as used herein, means the lineal distance between the motive exit 136 and the discharge entrance 152.

Referring to FIGS. 2 and 6, the discharge port 112 defines a discharge passageway 113, which diverges away from the suction chamber 107, that is in fluid communication with the suction chamber 107. The discharge port 112 includes an inlet end 150 within the suction chamber 107, having a discharge entrance 152, and an outlet end 154, distal from the suction chamber 107, having a discharge exit 156. The discharge passageway 113 terminates in a spout 170 protruding into the suction chamber 107, which has an internal width $W_I$ of about a 10 mm to about a 25 mm, or more preferably about 15 mm to about 20 mm. The spout 170 is disposed spaced apart from all one or more sidewalls 124 of the suction chamber 107 thereby providing suction flow around the entirety of an exterior surface 172 of the spout 170. The exterior surface 172 is generally frustoconical and converges toward the inlet end 150 of the discharge passageway 113. The exterior surface 172 may transition into a chamfer (not shown) more proximate the inlet end 150 than the second first end wall 122. The shape of the exterior surface 172, and/or the chamfer, and the generally rounded interior bottom of the suction chamber 107 are advantageous to direct suction flow toward the discharge entrance 152 and do so with minimal disturbance/interference in the flow.

The spout 170 has a wall thickness that may be about 0.5 mm to about 5 mm, or about 0.5 to about 3 mm, or about 1.0 mm to about 2.0 mm depending upon the material selected for the construction of the device 100.

Also, as best seen in FIG. 6, the cross-sectional area of the motive exits 136 (collectively) is smaller than the cross-sectional area of the discharge entrance 152, this difference is referred to as the offset. The offset of the cross-sectional areas may vary depending upon the parameters of the system into which the device 100 is to be incorporated. In one embodiment, the offset may be in the range of about 0.1 mm to about 2.0 mm, or more preferably in a range of about 0.3 mm to about 1.5 mm. In another embodiment, the offset may be in the range of about 0.5 m to about 1.2 mm, or more preferably in a range of about 0.7 to about 1.0 mm.

Figure 4:
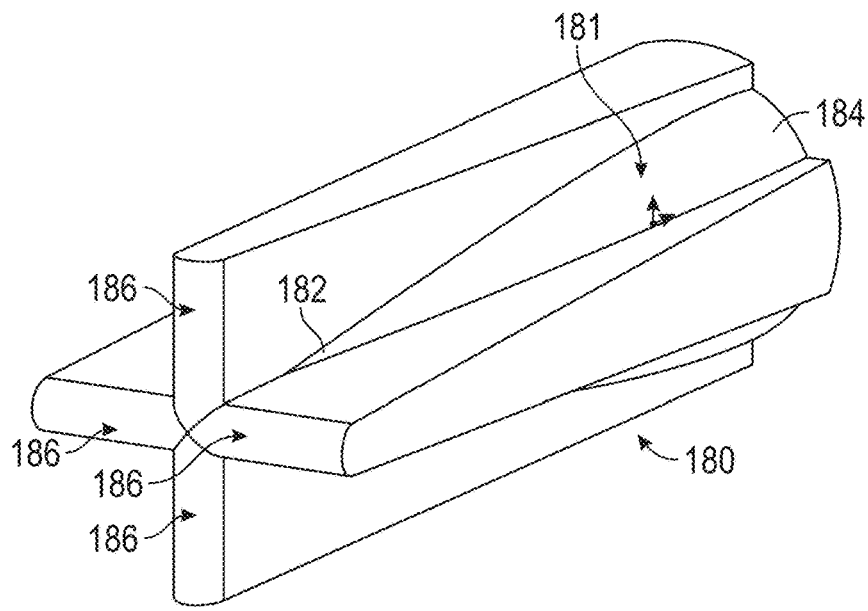
FIG. 4 is an enlarged, front perspective view of a fletch with a plurality of ribs projecting outward therefrom.
Figure 5:
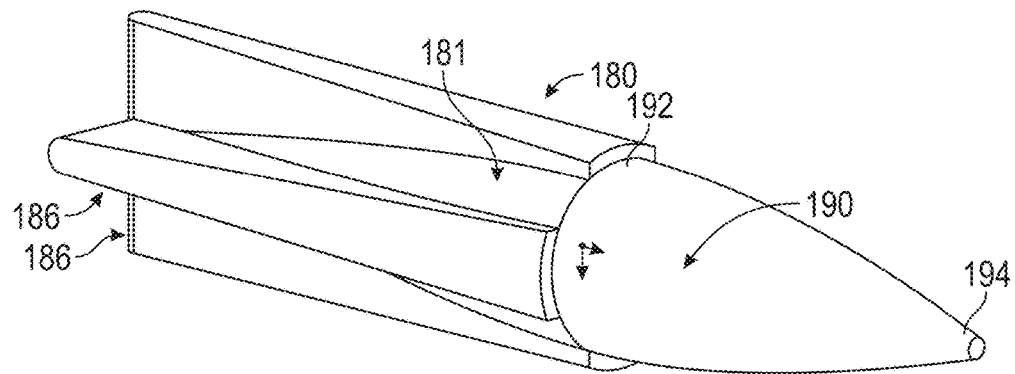
FIG. 5 is an enlarged, side, perspective view of the fletch of FIG. 4 having a tail connected thereto.

As seen from the end view in FIG. 3, the device 100 may include a fletch 180 positioned with the motive passageway 109. The fletch 180 is preferably positioned proximate the motive exits 136 and has an exterior surface shaped to reduce the cross-sectional flow area within the motive passageway 109, which may be accomplished by defining separate and distinct subpassageways each leading to a separate and distinct motive exit. Referring now to FIGS. 4-5 and 7, the fletch 180 has a main body 181 having a first end 182 and a second end 184. The main body 181 is generally conically-shaped with the first end 182 being the apex thereof, which is pointed toward the motive entrance 132, and the second end 184 being the base, which is juxtaposed to the motive exits 136. The conically-shaped main body 181 may converge from the apex to the base following a straight, parabolic, hyperbolic, or polynomial curve, and the exterior shape of the base (second end 184) shall be the same as that selected for the motive passageway 109 proximate the motive exits 136. For example, if the motive passageway is circular proximate the motive exits 136, the fletch with have a circular outer diameter, but if the motive passageway is elliptical, the fletch will have an elliptically-shaped outer dimension.

Fluid flow into and through the motive passageway 109 flows over the exterior surface of the generally conically-shaped fletch 180, and thereby directs the fluid flow toward the motive exits 136. As shown in FIGS. 3-4 and 7, a plurality of ribs 186 are present between the inner dimension of the motive passageway 109 and the exterior surface of the fletch 180. The plurality of ribs may be elongate protrusions extending outward from the exterior surface of the fletch 180 as shown in FIG. 4 or inward from the interior surface of the motive passageway 109 and running at least part of the length of the fletch 182, especially when the tail 190 of FIG. 5 is present.

The fletch 180 may be integrally formed into the portion of the housing 106 defining the motive passageway 109, for example as part of an injection molding process. Alternately, the fletch 180 may be fixedly attached within the motive passageway 109. The integral or fixed attachment of the fletch 180 within the housing 110 provides stability to the fletch 180 during fluid flow therethrough, substantially preventing or minimizing vibration of the fletch 180, which may arise due to the occurrence of fluid flow induced turbulence.

The ribs 186 provide an advantage of positioning the fletch 180 within the motive passageway 109 in a selected position in a supported manner (resistant to movement or misalignment therein), and even more importantly, further reduces the cross-sectional flow area within the motive passageway 109, which enables the generation of sufficient suction with a lower or minimal motive flow rate. The supported manner may include the ribs 188 being abutted against the inner surface of the motive passageway 109 or the fletch 180 being abutted against the ribs of the motive passageway 109. The plurality of ribs may be integrally formed as part of the fletch, for example as a molded part thereof, or may be fixedly attached thereto. In another embodiment, the ribs may be integrally formed as part of the motive passageway 109 or fixedly attached thereto. If the ribs are part of the fletch, the ribs may be press fit against or have an interference fit with the inside surface of the motive passageway 109 or may be connected to the inside surface of the motive passageway 109 by a key-to-keyway mechanism.

As best shown in FIG. 3, the plurality of ribs 186 divide the motive passageway and the fluid flow over the exterior surface of the fletch 180 into a plurality of sub-passageways 188, each converging toward the motive exits 136. In the embodiment of FIGS. 3-4 and 7, four ribs are present, which from the motive end view of FIG. 3, generally define the shape of a plus sign, i.e., two opposing ribs are oriented perpendicular to another set of opposing ribs, and thereby define four sub-passageways 188. In other embodiments, the plurality of ribs are of sufficient number to define any one of three through eight sub-passageways, which may be generally equally dimensioned.

Turning now to the embodiment in FIGS. 5 and 6, the fletch 180 may have connected thereto a tail 190 that is generally conically-shaped. The tail 190 is positioned with its base 192 juxtaposed to the second end 184 of the fletch 180 and its apex 194 positioned inside the spout 170 of the discharge passageway 113. Accordingly, a portion of the tail 190 is positioned within the suction chamber 107, and in particularly within the Venturi gap 160, thereby directing fluid flow into the discharge entrance 152. The conically-shaped tail 190 may converge from the apex 194 to the base 192 following a straight, parabolic, hyperbolic, or polynomial curve or function. The base 192 of the tail 190, in particular the exterior surface thereof, is shaped and dimensioned to mate with the second end 184 of the main body 181 of the fletch and form a continuous extension of the surface of the conically-shaped main body 181. For example, if the conically-shaped main body 181 has a circular outer diameter, then the tail 190 should have a circular outer diameter of the same dimension.

In another embodiment, not shown, the tail 190 includes ribs protruding from the exterior surface thereof that form continuations of the ribs 186 of the fletch 180.

When device 100 is for use in a vehicle engine, the vehicle manufacturer typically selects the size of both the motive port 108 and discharge port 112 based on the tubing/hose size available for connection of the evacuator Venturi device to the engine or components thereof. Additionally, the vehicle manufacturer typically selects the maximum motive flow rate available for use in the system, which in turn will dictate the area of the interior opening defined at the motive outlet end 134, i.e., the motive exits 136. Working within these constraints, the disclosed devices 100 significantly reduce the compromise between the desire to produce high suction flow rates at moderate motive flow rates provided under boost conditions of an engine.

In operation, the device 100, in particular the suction port 110, is connected to a device requiring vacuum (not shown), and the device 100 creates vacuum for said device by the flow of fluid, typically air, through passageway 104, extending generally the length of the device, and the Venturi gap 152 (labeled in FIGS. 2 and 5) defined thereby within the suction chamber 107. In one embodiment, the motive port 108 is connected for fluid communication of its motive passageway with a source of boost pressure and the discharge passageway is connected for fluid communication of its discharge passageway with a lower pressure, for example, atmospheric pressure. In such an embodiment, the device 100 may be referred to as an ejector. In another embodiment, the motive port 108 may be connected to atmospheric pressure and the discharge port may be connected to a source of pressure that is less than atmospheric pressure. In such an embodiment, the device 100 may be referred to as an aspirator. The flow of fluid (e.g., air) from the motive port to the discharge port draws the fluid down the motive passageway, which can be a straight cone or a hyperbolic profile as described herein. The reduction in area causes the velocity of the air to increase. Because this is an enclosed space the laws of fluid mechanics state that the static pressure must decrease when the fluid velocity increases. The minimum cross sectional area of the converging motive passageway abuts the Venturi gap. As air continues to travel to the discharge port it travels through the discharge entrance and converging discharge passageway, which is either a straight cone or a hyperbolic profile. Optionally, the discharge passageway can continue as a straight or hyperbolic profile cone until it joins the discharge exit, or it can transition to a simple cylindrical or tapered passage before reaching the discharge exit.

In a desire to increase the flow rate of air from the suction port 110 into the Venturi gap 160, the fletch 180 with ribs is introduced in the motive passageway 109, see FIGS. 3 and 7. The fletch 180 with the ribs defines a plurality of sub-passageways 188, which reduces the cross-sectional flow area proximate the motive exits 136 and thereby increases the velocity of the air to generate increased suction from a lower motive flow rate.

When the air flows out of the motive exit into the suction chamber this flow forms a plume of high velocity air relative to the slower suction air. This higher velocity motive air plume has a lower static pressure than the suction air, due to the high velocity. The interface between these two gases is initially quite distinct, as the gradient in pressure is high, although the boundary diminishes as the motive flow passes through the gap on its way to the discharge entrance. In order to maximize the amount of suction air that gets carried into the discharge passageway along with the motive flow, it is beneficial to increase the size or area of the boundary between the two flows (referred to as the boundary plume, which has a plume area). In some evacuator Venturi devices this increase in boundary is accomplished by increasing the area of the motive exit. A drawback to increasing the area of the motive exit is that the area of the boundary between the two flows is determined by the opening perimeter of the motive exit and the gap distance. The motive mass flow rate through the motive exit is a function of the cross-sectional area of the motive exit. As an example, Table 1 below compares three different evacuator Venturi devices: (A) a round motive exit; (B) an increased diameter round motive exit; and (C) a round motive exit with a fletch and ribs inside. Here, (A) is the standard for comparison for (B) and (C).

|  | A round motive exit | B round motive exit, D increased 50% | C round motive exit with fletch and ribs | Units |
| --- | --- | --- | --- | --- |
| motive exit diameter | 2.9 | 4.3 | 8.5 | mm |
| Venturi gap | 4 | 4.9 | 4 | mm |
| plume area of the boundary plume | 36 | 66 | 134 | mm² |
| motive exit area | 6.5 | 14.6 | 6.5 | mm² |
| motive flow rate | 1.3 | 3 | 1.3 | g/s |
| % Δ in plume area | 100% | 184% | 372% |  |
| % Δ in motive flow | 100% | 225% | 100% |  |
| Δ in plume area/Δ in motive flow | 100% | 82% | 372% |  |
| fletch exit diameter |  |  | 7.3 | mm |
| number of ribs |  |  | 5 |  |
| width of rib at motive exit |  |  | 2.8 | mm |
| angular width of rib |  |  | 40.6 | degrees |
| obstructive are of rib |  |  | 1.7 | mm² |

By increasing the motive exit diameter by 50% there is an 84% increase (change) in the plume area (i.e., 184%–100%=84%). Due to various issues such as boundary layer effects, and suction flow distribution, this will create a suction flow increase of less than 84%. The motive flow however has increased by 125% (i.e., 225%–100%=125%). When the fletch is added to the motive a dramatic change in performance occurs, which is far superior to (A) and (B). The plume area of the boundary plume increases by 272% (372%–100%=272%), while the motive flow is unchanged.

Figure 8:
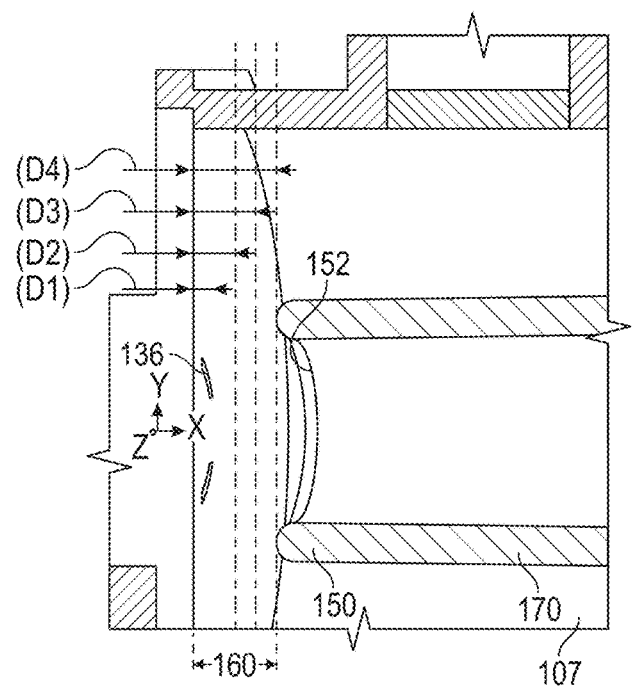
FIG. 8 is an enlarged, cross-sectional, perspective view of the Venturi gap and discharge inlet with four different distances ($D_1$ through $D_4$) labeled relative to the plurality of motive exits.
Figure 9:
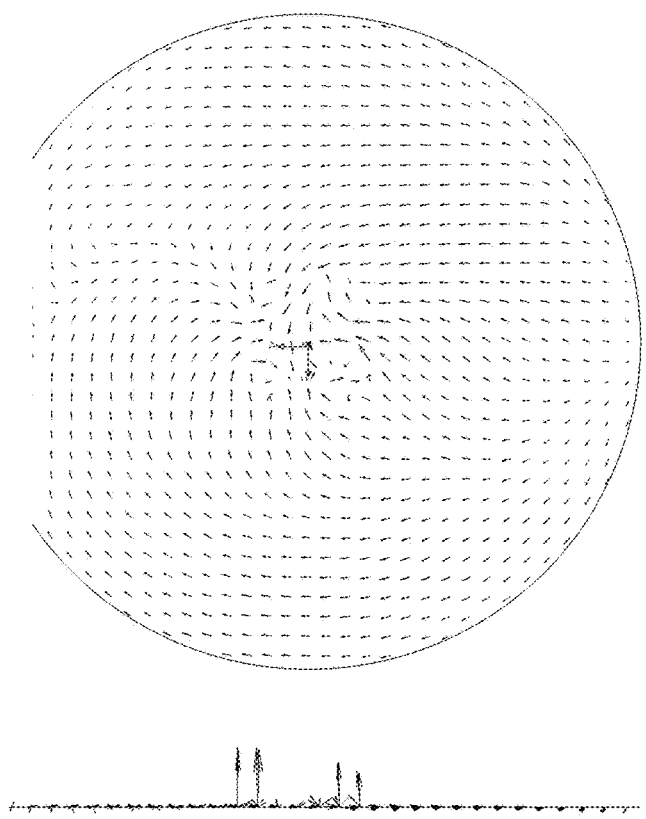
FIG. 9 includes computational fluid dynamic (CFD) modelings of the suction flow, taken at distance $D_1$ of FIG. 8, as it engages the motive plume.
Figure 9:
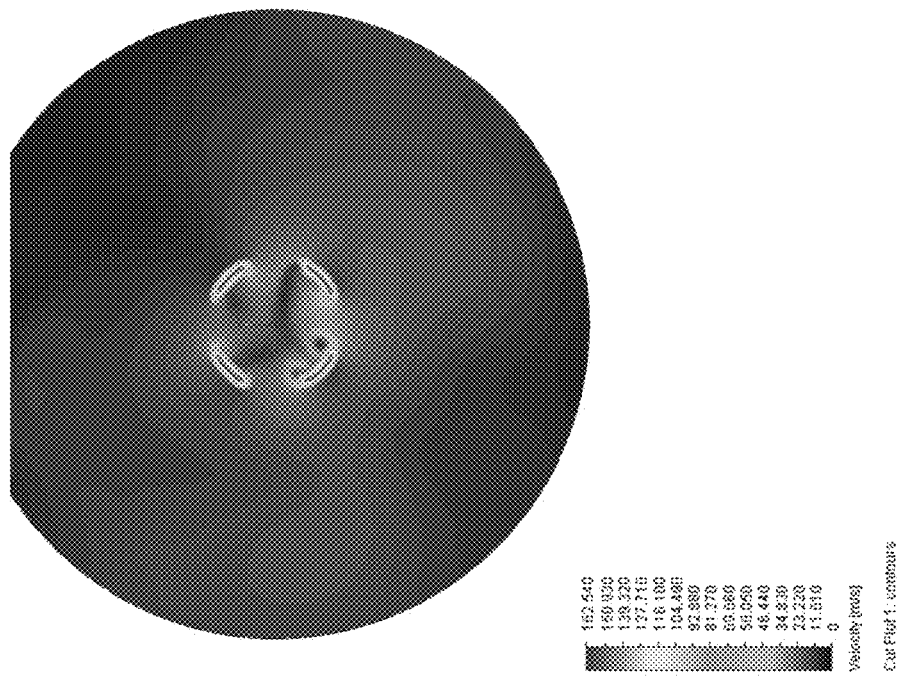
Figure 10:
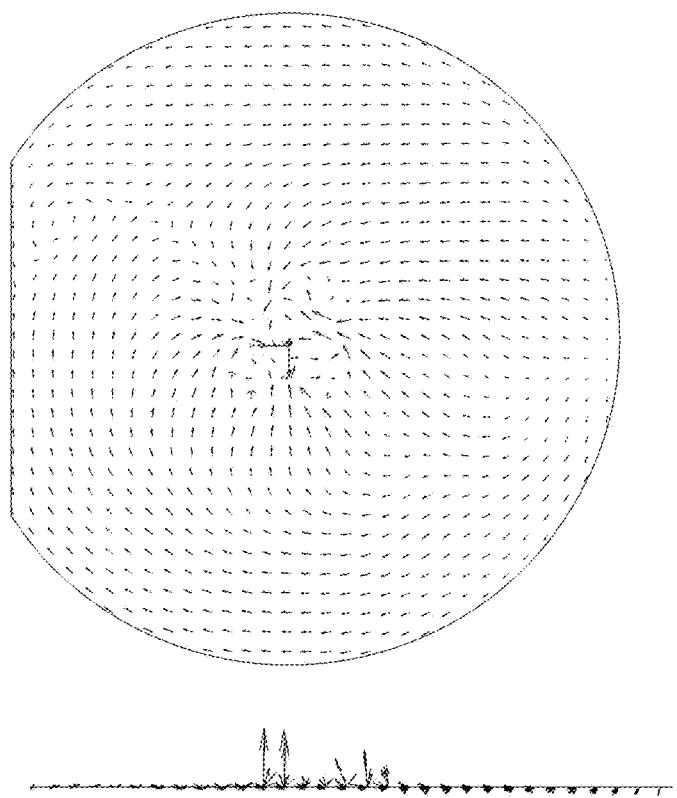
FIG. 10 includes CFD modelings of the suction flow, taken at distance $D_2$ of FIG. 8, as it engages the motive plume.
Figure 10:
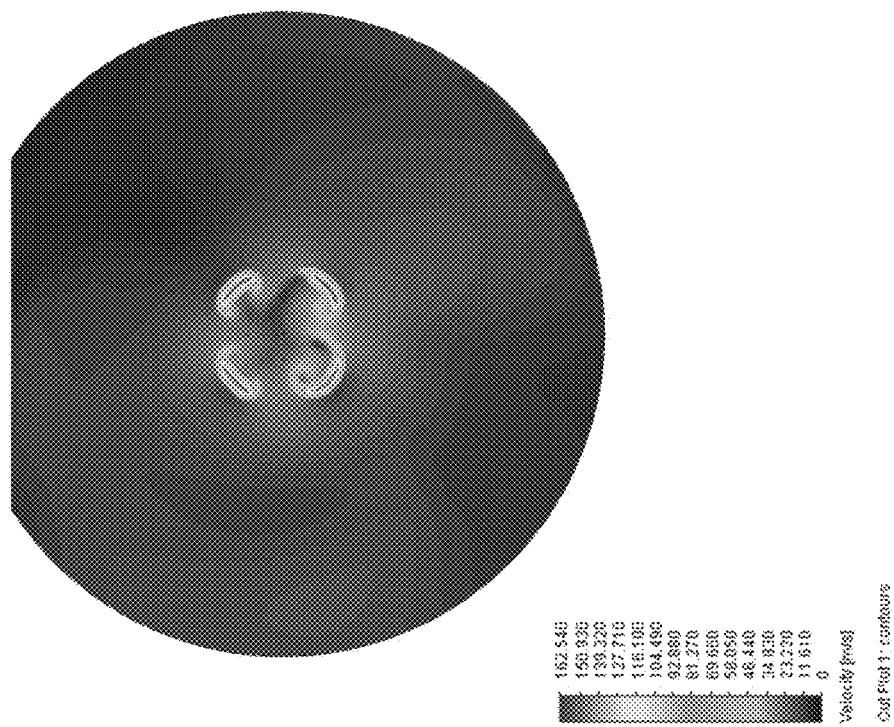
Figure 12:
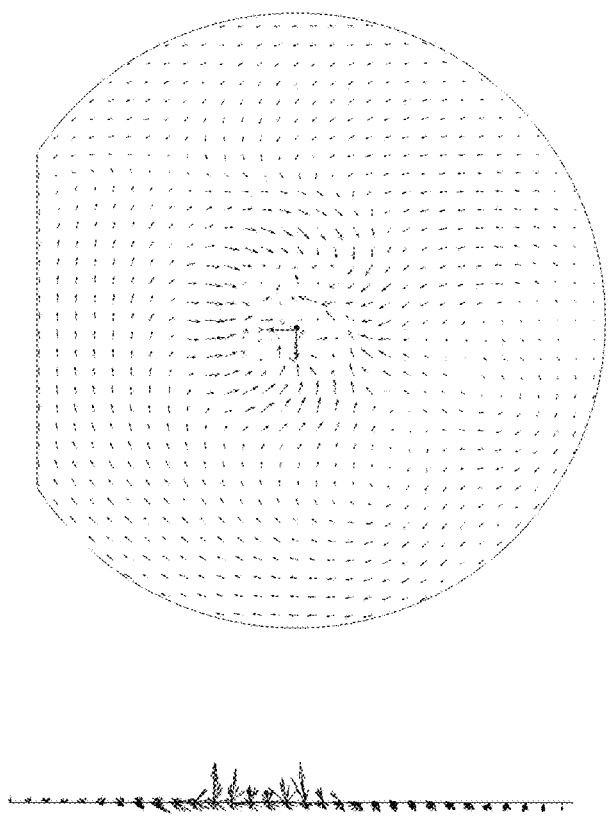
FIG. 12 includes CFD modelings of the suction flow, taken at distance $D_4$ of FIG. 8, as it engages the motive plume.
Figure 12:
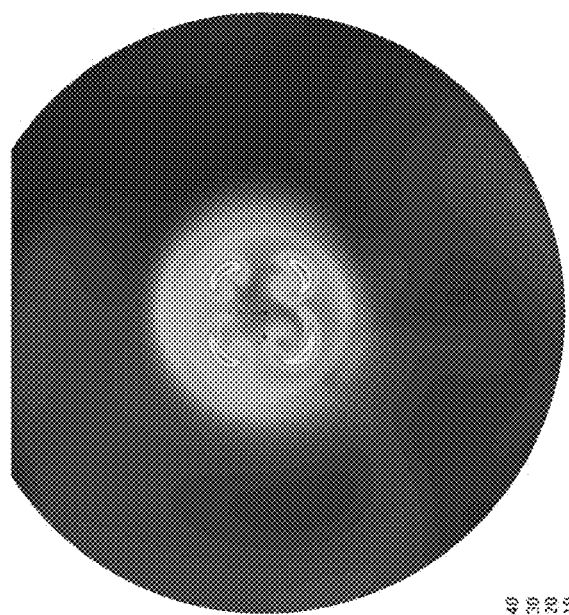
Figure 12:
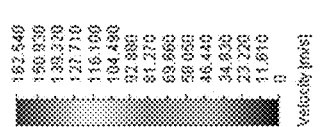

The boundary plume is illustrated through the CFD images in FIGS. 9-12. FIG. 9 is at distance $D_1$ in FIG. 8. FIG. 10 is at distance $D_2$ in FIG. 8. FIG. 11 is at distance $D_3$ in FIG. 8. FIG. 12 is at distance $D_4$ in FIG. 8. In the color images on the left hand side of each of FIGS. 9-12, the suction region flow velocity is portrayed as a color field, with the maximum velocity in red and the minimum in blue. In the central image in each of FIGS. 9-12, the suction region flow velocity, at the same transverse cross section, is portrayed as a magnitude vector. In the right hand side image in each of FIGS. 9-12, the suction region flow velocity is portrayed as a magnitude and direction vector.

In addition to the fletch 180 being present in the evacuator Venturi device, the area of the boundary plume may be increased by increasing the perimeter of the motive exit 136 and the discharge entrance 152 without increasing the overall inner dimension of the first motive passageway 109 and the discharge passageway 113 (preferably with no increase in the mass flow rate). In particular, the motive exit 136 and the discharge entrance 152 are preferably non-circular as explained in co-owned U.S. patent application Ser. No. 14/294,727, filed on Jun. 3, 2014 because a non-circular shaped having the same area as a passageway with a circular cross-section is an increase in the ratio of perimeter to area. There are an infinite number of possible shapes that are not circular, each with a perimeter and a cross sectional area. These include polygons, or straight line segments connected to each other, non-circular curves, and even fractal curves. To minimize cost a curve is simpler and easy to manufacture and inspect, and has a desirable perimeter length. In particular, elliptical- or polygonal-shaped embodiments for the internal cross-sections of the motive and discharge passageways are discussed in the co-owned application referred to above.

The devices disclosed herein may be made of a plastic material or other suitable material(s) for use in a vehicle engine, one that can withstand engine and road conditions, including temperature, moisture, pressures, vibration, and dirt and debris, and may be made by injection molding or other casting or molding processes.

Although the invention is shown and described with respect to certain embodiments, it is obvious that modifications will occur to those skilled in the art upon reading and understanding the specification, and the present invention includes all such modifications.

What is claimed is:

1. A device for producing vacuum using the Venturi effect comprising:
   a housing defining a suction chamber, a motive passageway converging toward the suction chamber and in fluid communication therewith, a discharge passageway diverging away from the suction chamber and in fluid communication therewith, and a suction passageway in fluid communication with the suction chamber;
   wherein the motive passageway has a single entrance and a plurality of motive exits, and
   a fletch in the motive passageway to subdivide the motive passageway downstream of the single entrance into a plurality of subpassageways, one each converging toward one of the plurality of motive exits;
   wherein the plurality of motive exits are aligned with and spaced apart from a discharge entrance of the discharge passageway to define a Venturi gap;
   wherein the fletch further comprises a tail positioned within the suction chamber in alignment with the plurality of motive exits for fluid flow from the plurality of motive exits to flow over an exterior surface of the tail.

2. The device of claim 1, wherein the fletch has a conically-shaped main body positioned with a base of the main body proximate the plurality of motive exits, and a plurality of ribs extending between an exterior surface of the conically-shaped main body and an interior surface of the motive passageway, thereby defining the plurality of subpassageways.

3. The device of claim 2, wherein the conically-shaped main body converges toward its base following a straight, parabolic, hyperbolic, or polynomial curve function.

4. The device of claim 2, wherein the interior shape of the motive passageway proximate the plurality of motive exits and the exterior shape of the base of the conically-shaped main body are both circular or elliptical.

5. The device of claim 2, wherein the plurality of ribs protrude from the exterior surface of the conically-shaped main body.

6. The device of claim 1, wherein the cross-sectional area of the plurality of motive exits, collectively, is smaller than the cross-sectional area of the discharge entrance.

7. A device for producing vacuum using the Venturi effect comprising:
   a housing defining a suction chamber, a motive passageway converging toward the suction chamber and in fluid communication therewith, a discharge passageway diverging away from the suction chamber and in fluid communication therewith, and a suction passageway in fluid communication with the suction chamber;
   wherein the motive passageway has a single entrance and a plurality of motive exits, and subdivides downstream of the single entrance into a plurality of subpassageways, one each leading to one of the plurality of motive exits; and
   wherein the plurality of motive exits are aligned with and spaced apart from a discharge entrance of the discharge passageway to define a Venturi gap;
   wherein the discharge entrance protrudes into the suction chamber a distance thereby providing suction flow around the entirety of an exterior surface of the discharge entrance.

8. The device of claim 2, wherein fluid flow from the plurality of motive exits flows over the exterior surface of the tail toward an apex of the tail; wherein the apex of the tail is positioned inside the discharge entrance of the discharge passageway.

9. The device of claim 7, wherein the suction chamber has a rounded interior bottom below the discharge entrance.

10. The device of claim 7, wherein the suction chamber has an internal width of a 10 mm to a 25 mm.

11. The device of claim 1, wherein the motive passageway and the discharge passageway both diverge in cross-sectional area away from the suction chamber as a hyperbolic or parabolic function.

12. The device of claim 1, wherein each subpassageway is rectangular in cross-section proximate one of the plurality of motive exits.

13. The device of claim 12, wherein each subpassageway converges toward one of the plurality of motive exits from a main passageway with an outer interior wall, when viewed from a top, longitudinal cross-section, as a hyperbolic function.

14. The device of claim 13, wherein each subpassageway converges toward one of the plurality of motive exits from the main passageway with an inner interior wall, when viewed from a top, longitudinal cross-section, as a hyperbolic function.

15. A system comprising:
   the Venturi device of claim 1;
   a source of pressure fluidly connected to the motive passageway;
   a device requiring vacuum fluidly connected to the suction passageway; and
   a pressure lower than the source of pressure is fluidly connected to the discharge passageway.

16. The system of claim 15, wherein the source of pressure is atmospheric pressure or is boost pressure from a compressor of a turbocharger or supercharger.

* * * * *